US006424147B1

(12) United States Patent
Kato et al.

(10) Patent No.: US 6,424,147 B1
(45) Date of Patent: Jul. 23, 2002

(54) ROTATION ANGLE DETECTION APPARATUS FOR CALCULATING A ROTATION ANGLE BY ATTAINING AN ARCTANGENT ANGLE OF A DIVIDEND WHERE A SMALL AMPLITUDE ABSOLUTE VALUE OF TWO SINUSOIDAL WAVE DETECTION SIGNALS HAVING A PHASE DIFFERENCE IS DIVIDED BY A LARGE AMPLITUDE ABSOLUTE VALUE

(75) Inventors: Hironori Kato; Toshiyuki Hoshi; Yoshio Sanpei; Hirofumi Okumura, all of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/690,583

(22) Filed: Oct. 17, 2000

(30) Foreign Application Priority Data

Oct. 19, 1999 (JP) .......................................... 11-297071

(51) Int. Cl.[7] ............................ G01B 7/14; G01R 33/06
(52) U.S. Cl. ............................... 324/207.2; 324/207.25
(58) Field of Search ........................ 324/207.2, 207.21, 324/207.25, 207.11, 207.12, 207.14, 173, 174; 180/412, 413, 414, 427

(56) References Cited

U.S. PATENT DOCUMENTS 4,779,693 A * 10/1988 Takahashi et al. .......... 180/412
5,656,936 A    8/1997 Ao et al.
6,246,232 B1 * 1/2001 Okumura .................. 324/207.2

* cited by examiner

Primary Examiner—Edward Lefkowitz
Assistant Examiner—Subhash Zaveri
(74) Attorney, Agent, or Firm—Brinks Hofer Gilson & Lione

(57) ABSTRACT

The rotation angle detection apparatus comprises: a rotor connected to a rotating body, a rotation angle detection unit, a memory unit and a control unit. Control unit detects an amplitude absolute value of a first angle detection signal and amplitude absolute value of a second angle detection signal. Control unit compares detected amplitude absolute value of first angle detection signal and amplitude absolute value of second angle detection signal to determine which is a smaller amplitude absolute value or a larger amplitude absolute value. Control unit calculates a basic rotation angle of the rotating body based on an arctangent angle of a quotient value obtained by dividing the smaller amplitude absolute value by the larger amplitude absolute value. Control unit converts the basic rotation angle to a different angle value for each of a plurality of angle processing cases, and the rotation angle of the rotating body is detected.

8 Claims, 10 Drawing Sheets

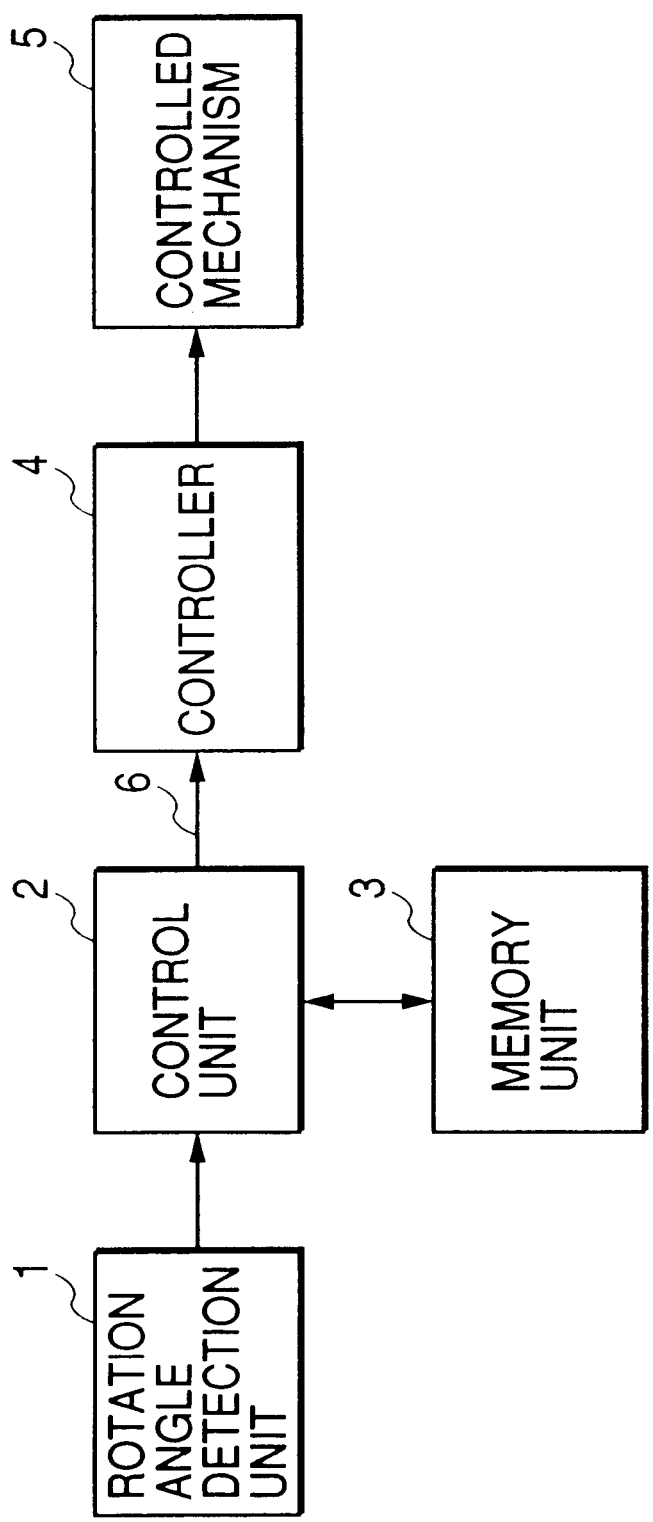

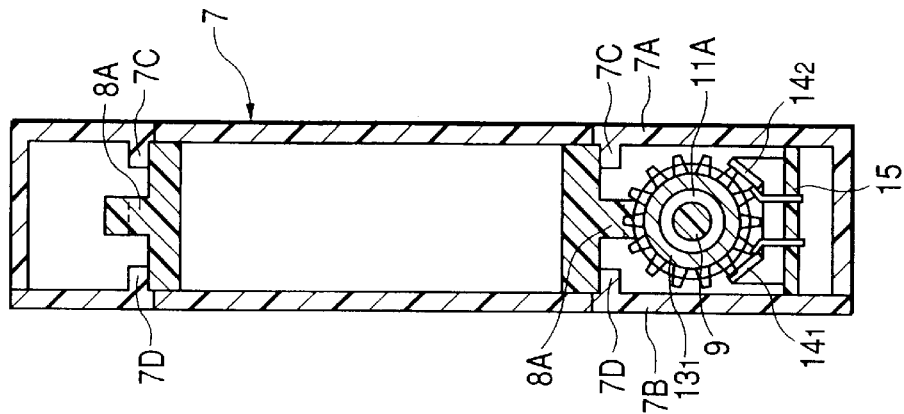
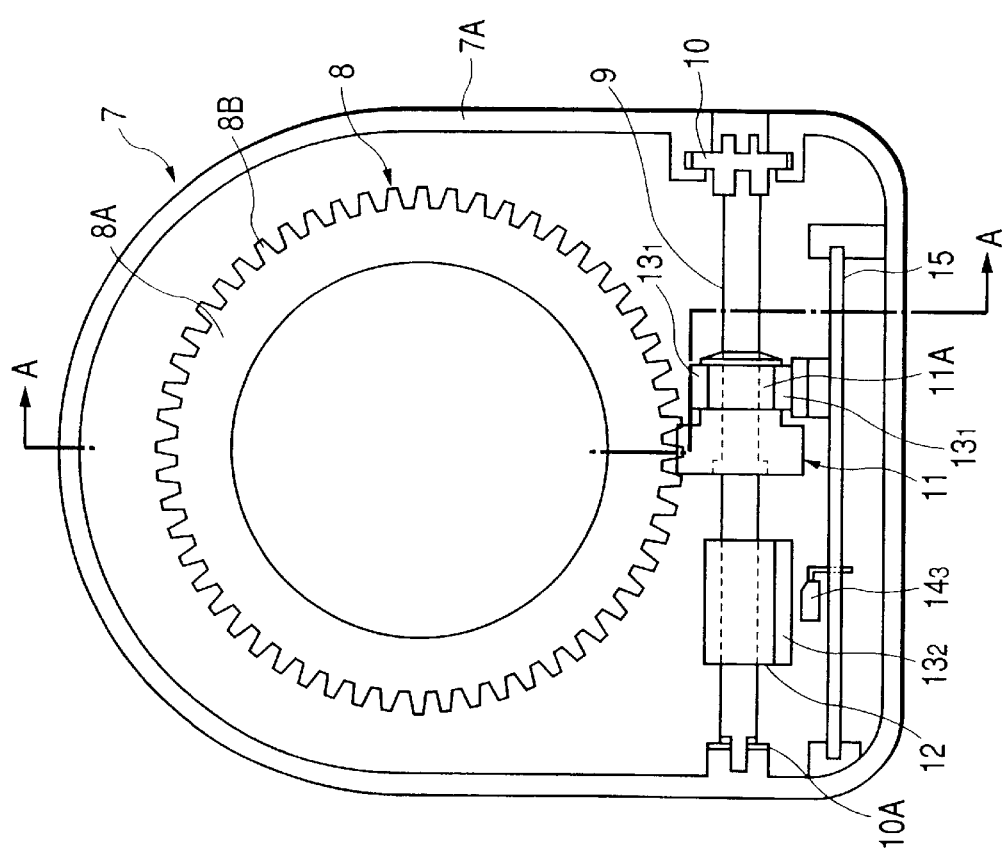

ROTATION ANGLE DETECTION APPARATUS FOR CALCULATING A ROTATION ANGLE BY ATTAINING AN ARCTANGENT ANGLE OF A DIVIDEND WHERE A SMALL AMPLITUDE ABSOLUTE VALUE OF TWO SINUSOIDAL WAVE DETECTION SIGNALS HAVING A PHASE DIFFERENCE IS DIVIDED BY A LARGE AMPLITUDE ABSOLUTE VALUE

BACKGROUND OF THE INVENTION

1. Field of the Invention

The present invention relates to a rotation angle detection apparatus, and more particularly relates to a rotation angle detection apparatus that is connected to a rotor such as a steering shaft of an automobile capable of generating two angle detection signals having 90 degree phase difference corresponding to the rotation angle and rotation direction of a steering wheel and capable of correctly detecting the rotation angle of the rotor by obtaining the cotangent angle of the obtained two angle detection signals.

2. Description of the Related Art

Generally, a rotation angle detection apparatus, which is an apparatus used for detecting the rotation angle of a rotor, is provided at least with a rotation angle detection unit for detecting the rotation angle of a rotor, a control unit for controlling the operation of the rotation angle detection apparatus, and a controller for controlling a controlled mechanism. In the case that a rotation angle detection apparatus is used for detecting the rotation angle of a steering shaft of an automobile, the rotation angle detection apparatus is mounted on an automobile, and a rotation angle detection unit is coupled with a steering shaft of the automobile. In this case, various types of rotation sensors have been used for a rotation angle detection unit in a rotation angle detection apparatus mounted on an automobile, a rotation sensor as described hereunder has been proposed as one of these various types of rotation sensors.

The above-mentioned proposed rotation sensor has a rotation angle detection unit provided with a base member and a rotor unit disposed rotatable with respect to the base member, and the rotor unit is coupled to a rotor, namely a steering shaft of an automobile in this case. Furthermore, the rotation angle detection unit has a first magnet and a second magnet disposed on the base member, a first Hall element and a second Hall element disposed on the rotor unit with approximately 90 degree interval at the position facing to the first magnet, and a third Hall element disposed at the position facing to the second magnet. When the rotor namely the rotor unit is rotated, the sine wave-like first angle detection signal and the second angle detection signal having the constant maximum amplitude, the same period, and 1/4 wavelength phase difference are generated, and a third angle detection signal having a period of the entire rotation range of the rotor unit that increases linearly is generated simultaneously from the third Hall element.

The generated first angle detection signal, the second angle detection signal, and the third angle detection signal are supplied to the control unit. The control unit detects the rough rotation angel and rotation direction with reference to the neutral position of the steering wheel (steering shaft) based on the supplied third angle detection signal. The control unit detects the fine rotation angle with reference to the neutral position of the steering wheel based on the supplied first angle detection signal and second angle detection signal. Then, the control unit supplies the rotation angle and rotation direction with reference to the neutral position of the steering wheel to the controller as the angle detection information. The controller finely performs suspension control and automatic transmission control of an automobile based on the supplied angle detection information.

Herein, FIG. 3 shows a characteristic diagram for describing the relation between the rotation angle of the steering wheel generated from the rotation sensor and the respective detection signal voltage values of the first to third angle detection signals in the rotation angle detection apparatus in which the above-mentioned proposed rotation sensor is used.

In FIG. 3, 16 represents the first angle detection signal, 17 represents the second angle detection signal, and 18 represents the third angle detection signal. These three signals represent the change of respective detection signal voltage values of the first to third angle detection signals 16, 17, and 18 for the entire rotation angle (±720 degrees with respect to the neutral position) of the steering wheel.

In this case, the first angle detection signal 16 and the second angle detection signal 17 are the same sine wave-like signals having the same maximum amplitude and the same one period, and having the 1/4 wavelength phase difference. The maximum voltage value is 4.5 V and the minimum voltage value is 0.5 V for both signals. The first angle detection signal 16 falls to the minimum value (voltage value of 0.5 V) at the rotation angles of −22.5 degrees and +67.5 degrees with respect to the neutral position, at the rotation angles of successive subtraction of −90 degrees from −22.5 degrees, and at the rotation angles of successive addition of +90 degrees to +6.75 degrees. The second angle detection signal 17 falls to the minimum value (voltage value of 0.5 V) at the rotation angle of the neutral position 0 degree, at the rotation angles of successive subtraction of −90 degrees from 0 degree, and at the rotation angle of successive addition of +90 degrees to 0 degree. On the other hand, the third detection signal 18 increases linearly from the rotation angle of −720 degrees to +720 degrees, and takes the minimum value (voltage value of 0.5 V) at the rotation angle of −720 degrees and takes the maximum value (voltage value of 4.5 V) at the rotation angle of +720 degrees.

FIG. 10 is a characteristic diagram that shows the enlarged range from the rotation angle of −90 degrees to +90 degrees of the characteristic diagram shown in FIG. 3.

In FIG. 10, 16U is an approximately linear upward (slope) portion of the first angle detection signal 16, 16D is an approximately linear downward (slope) portion of the first angle detection signal 16, 17U is an approximately linear upward (slope) portion of the second angle detection signal 17, and 17D is an approximately linear downward (slope) portion of the second angle detection signal 17. The same components shown in FIG. 10 as those shown in FIG. 3 are given the same characters.

The detection of the rotation angle and the rotation direction of the steering wheel executed by means of the known rotation angle detection apparatus will be described with reference to the characteristic diagram shown in FIG. 10.

At first, when the control unit detects the rotation direction with respect to the neutral position (rotation angle of 0 degree) of the steering wheel, the control unit uses the voltage value of the supplied third angle detection signal 18. In detail, if the voltage value of the third angle detection signal 18 is larger than 2.5 V, the control unit detects that the rotation direction of the steering wheel is the one direction (positive rotation angle direction) with respect to the neutral position, on the other hand if the voltage value of the third angle detection signal 18 is smaller than 2.5 V, the control unit detects that the rotation direction of the steering wheel is the other direction (negative rotation angle direction) with respect to the neutral position.

Next, the control unit divides the entire rotation angle ±720 degrees of the steering wheel into rotation angle sections N−1, N, N+1, . . . . that are corresponding to each one wavelength of the first angle detection signal 16 and the second angle detection signal 17 as shown in FIG. 10, and detects the rough rotation angle that represents what rotation angle section corresponds to the rotation angle of the steering wheel depending on the voltage value of the supplied third angle detection signal 18. For example, when the control unit detects 2.8 V as the voltage value of the third angle detection signal 18, the control unit detects the angle section N as the angle section that is corresponding to that voltage value.

Next, the control unit determines the first voltage value $V_1$ and the second voltage value $V_2$ when the voltage value of the first angle detection signal 16 coincides with the voltage value of the second angle detection signal 17 in the detected angle section N. Then, the control unit specifies the first (second) angle detection signal 16 (17) located outside the range of the first voltage value $V_1$ and the second voltage value $V_2$, and specifies the first (second) angle detection signal 16 (17) located inside the range of the first voltage value $V_1$ and the second voltage value $V_2$ by use of the determined first voltage value $V_1$ and the second voltage value $V_2$.

Subsequently, the control unit determines whether the angle detection signal 16 (17) located inside the range of the first voltage value $V_1$ and the second voltage value $V_2$ is the first angle detection signal 16 or the second angle detection signal 17. Simultaneously, the control unit determines whether the first (second) angle detection signal 16 (17) located outside the range of the first voltage value $V_1$ and the second voltage value $V_2$ is smaller than the first voltage value $V_1$ or larger than the second voltage value $V_2$, and determines that the first (second) angle detection signal 16 (17) located inside the range of the first voltage value $V_1$ and the second voltage value $V_2$ is in which divided angle section out of the first divided angle section H1, the second divided angle section H2, the third divided angle section H3, and the fourth divided angle section H4, which have been formed by dividing one angle section N into four subsections.

As described hereinabove, by determining that the first (second) angle detection signal 16 (17) is in which divided angle section out of H1 to H4 in one angle section N, the control unit detects the fine rotation angle of the steering wheel.

Because in the conventional rotation angle detection apparatus the linear slope portions 16U, 16D, 17U, and 17D on the first angle section H1 to the fourth angle section H4 of the first and second angle detection signals 16 and 17 are used for detecting the fine rotation angle of the steering wheel, the detected value is discontinued at the switching point between the preceding linear slope portion (for example, 16U) and the subsequent linear portion (for example, 17U) when the detected fine rotation angle is switched from the one angle section (for example, the first angle section H1) to the next one angle section (for example, the second angle section H2).

In this case, if no rotation angle detection error is included in the preceding linear slope portion 16U and the subsequent linear slope portion 17U, then no error is included in the rotation angle detection value obtained by use of the preceding linear slope portion 16U and the subsequent linear slope portion 17U.

However, because the linear slope portion usually includes some rotation angle detection error though slightly, the rotation angle detection value fluctuates temporarily depending on the error direction of the rotation angle detection error when the preceding linear slope portion 16U is switched to the subsequent linear slope portion 17U.

A method for detecting the fine rotation angle of a steering wheel by use of the average amplitude value has been proposed by the applicant of the present invention in order to reduce such rotation angle detection value error that occurs in association with the conventional rotation angle detection apparatus. In this method, when the control unit detects the fine rotation angle by use of the first angle detection signal 16 and the second angle detection signal 17 generated from the rotation angle detection unit, the first area that locates in the range of 1/6 period around the center at the time point when the first (second) angle detection signal 16 (17) passes the average of the maximum value and the minimum value (in this case, the value obtained by subtracting the average value of the maximum value and the minimum value from the first (second) angle detection signal 16 (17) is defined to as the amplitude), the second area that locates in the range of 1/12 period of the first (second) angle detection signal 16 (17) outside the first area, and the third area that locates in the range of 1/12 period of the first (second) angle detection signal 16 (17) outside the second area are defined. To detect the fine rotation angle of the steering wheel, only the amplitude of the first (second) angle detection signal 16 (17) is used when the first (second) angle detection signal 16 (17) is in the first area, the amplitude obtained by averaging the amplitude of the first (second) angle detection signal 16 (17) and the amplitude of the second (first) angle detection signal 17 (16) in the ratio of 7:3 is used when the first (second) angle detection signal 16 (17) is in the second area, and the amplitude obtained by averaging the amplitude of the first (second) angle detection signal 16 (17) and the amplitude of the second (first) angle detection signal 17 (16) in the ratio 5:5 is used when the first (second) angle detection signal 16 (17) is in the third area.

According to the rotation angle detection apparatus described in the new proposal, even though the linear slope portions 16U and 16D of the first angle detection signal 16 and the linear slope portions 17U and 17D of the second angle detection signal 17 include slight rotation angle detection error, the rotation angle can be detected with smaller influence of the rotation angle detection error by use of the average amplitude values.

According to the rotation angle detection apparatus described in the new proposal, even though the linear slope portions 16U and 16D of the first angle detection signal 16 and/or the linear slope portions 17U and 17D of the second angle detection signal 17 include slight rotation angle detection error, the influence of the rotation angle detection error is reduced and the rotation angle is detected at high accuracy because the fine rotation angle of a steering wheel is detected by use of the average amplitude obtained by averaging the amplitude of the first angle detection signal 16 and the amplitude of the second angle detection signal 17 in the predetermined ratio near the switching area when the linear slope portion of the first (second) angle detection signal 16 (17) is switched to the linear slope portion of the second (first) angle detection signal 17 (16)

However, in the rotation angle detection apparatus described in the new proposal, though the rotation angle is detected by use of the average amplitude obtained by averaging the amplitude of the first angle detection signal 16 and the amplitude of the second angle detection signal 17 in the predetermined ratio, because the linear slope portions 16U and 16D of the first angle detection signal 16 and the linear slope portions 17U and 17D of the second angle detection signal 17 are used together with the amplitude of other portions, it is difficult to detect the rotation angle at higher accuracy, and it has been desired to develop an angle detection apparatus that is capable of detecting the rotation angle at higher accuracy.

SUMMARY OF THE INVENTION

The present invention has been accomplished in view of the technical background as described hereinabove, and it is an object of the present invention to provides a rotation angle detection apparatus that is capable of detecting the rotation angle at higher accuracy by detecting the rotation angle by use of the arctangent angle of the continuous amplitude ratio of the first and second angle detection signals.

To achieve the above-mentioned object, a rotation angle detection apparatus in accordance with the present invention comprises a rotor connected to a rotating body, a rotation angle detection unit for generating the first angle detection signal and the second angle detection signal of the sine waveform having a constant maximum amplitude and the same period and having approximately 1/4 wavelength phase difference concomitantly with the rotation of the rotor, a memory unit for storing the first angle detection signal and the second angle detection signal, and a control unit, wherein the control unit continuously detects the amplitude of the angle detection signal and the second angle detection signal, compares the detected amplitude absolute value of the first angle detection signal and amplitude absolute value of the second angle detection signal, determines the arctangent angle of the quotient value obtained by dividing the smaller amplitude absolute value by the larger amplitude absolute value to calculate the basic rotation angle of the rotating body, sets a plurality of angle processing cases based on the amplitude value of the first angle detection signal and/or the amplitude value of the second angle detection signal that have been calculated as described hereinabove, and converts the detected basic rotation angle to the different angle value according to the predetermined conversion equation for each of the plurality of angle processing cases that have been set as described hereinabove, and the rotation angle of the rotating body is thereby detected.

According to the above-mentioned structure, it is possible to use the continuous signal amplitude of the first angle detection signal and the second angle detection signal and to detect the rotation angle that is scarcely affected by the rotation angle detection error, and furthermore it is possible to detect the rotation angle with a high accuracy because the obtained oration angle value is converted to the corrected angle value that is suitable for the angle processing for each of angle processing cases.

In the rotation angle detection apparatus of the present invention, the rotation angle detection unit has two magnetic sensors facing to a magnet, and the two magnetic sensors generate the first angle detection signal and the second angle detection signal respectively concomitantly with rotation of the rotor.

Even though the output of the first angle detection signal and the second angle detection signal ark is reduced due to deterioration of the magnetic sensors, both magnetic sensors deteriorate similarly, the influence of the deterioration is offset, and as the result the arctangent value is scarcely affected because of the above-mentioned structure.

In the rotation angle detection apparatus in accordance with the present invention, it is preferable that the detected basic rotation angle is corrected by use of the correction value that is depending on the attached position error value of the two magnetic sensors.

Because the angle error due to the attached position error of the two magnetic sensors is eliminated from the angle value that has been converted according to the predetermined conversion equation set for each of a plurality of angle processing cases, the sine wave error string having a period corresponding to the attached position error of the two magnetic sensors included in the basic rotation angle is reduced significantly. As the result, it is made possible to detect the rotation angle with a higher accuracy.

Furthermore, in the rotation angle detection apparatus in accordance with the present invention, it is preferable that the angle processing case is set depending on the polarity, namely positive polarity or negative polarity, of each amplitude and the magnitude of the amplitude absolute value of the amplitude in the case that the first angle detection signal and the second angle detection signal are both used.

According to the above-mentioned structure, the rotation angle is detected with a high accuracy.

Furthermore, in the rotation angle detection apparatus in accordance with the present invention, it is preferable that the set angle processing case is selected so that; the arctangent angle is set as the rotation angle when the amplitude value of the first angle detection signal is equal to or larger than zero, the amplitude absolute value of the first angle detection signal is equal to or smaller than the amplitude absolute value of the second angle detection signal, and the amplitude value of the second angle detection signal is smaller than zero; the value obtained by subtracting the arctangent angle from 180 degrees is set as the rotation angle when the amplitude value of the first angle detection signal is equal to or larger than zero, the amplitude absolute value of the first angle detection signal is equal to or smaller than the amplitude absolute value of the second angle detection signal, and the amplitude value of the second angle detection signal is equal to or larger than zero; the value obtained by adding the arctangent angle to 90 degrees is set as the rotation angle when the amplitude value of the first angle detection signal is equal to or larger than zero, the amplitude absolute value of the first angle detection signal is larger than the amplitude absolute value of the second angle detection signal, and the amplitude value of the second angle detection signal is equal to or larger than zero; the value obtained by subtracting the arctangent angle from 90 degrees is set as the rotation angle when the amplitude value of the first angle detection signal is equal to or larger than zero, the amplitude absolute value of the first angle detection signal is larger than the amplitude absolute value of the second angle detection signal, and the amplitude value of the second angle detection signal is smaller than zero; the value obtained by subtracting the arctangent angle from 270 degrees is set as the rotation angle when the amplitude value of the first angle detection signal is smaller than zero, the amplitude absolute value of the first angle detection signal is equal to or larger than the amplitude absolute value of the second angle detection signal, and the amplitude value of the second angle detection signal is equal to or larger than zero; the value obtained by adding the arctangent angle to 270 degrees is set as the rotation angle when the amplitude value of the first angle detection signal is smaller than zero, the amplitude absolute value of the first angle detection signal is equal to or larger than the amplitude absolute value of the second angle detection signal, and the amplitude value of the second angle detection signal is smaller than zero; the value obtained by adding the arctangent angle to 180 degrees is set as the rotation angle when the amplitude value of the first angle detection signal is smaller than zero, the amplitude absolute value of the first angle detection signal is smaller than the amplitude absolute value of the second angle detection signal, and the amplitude value of the second angle detection signal is equal to or larger than zero; and the value obtained by subtracting the arctangent angle from 360 degrees is set as the rotation angle when the amplitude value of the first angle detection signal is smaller than zero, the amplitude absolute value of the first angle detection signal is smaller than the amplitude absolute value of the second angle detection signal, and the amplitude value of the second angle detection signal is smaller than zero.

By applying the above-mentioned structure, the rotation error is detected reliably with a high accuracy regardless of the magnitude of the rotation angle.

In the rotation angle detection apparatus in accordance with the present invention, it is more preferable that the rotating body is a steering shaft of an automobile, and the rotation angle signal calculated from the first angle detection signal and second angle detection signal is a steering angle signal of the steering shaft.

By applying the above-mentioned structure, the rotation angle of a steering shaft of an automobile is detected with high accuracy.

In the rotation angle detection apparatus in accordance with the present invention, it is preferable that the steering angle detection signal is supplied to a controller through a local area network bus line installed in the automobile.

Thereby, the suspension and the automatic transmission mechanism are controlled properly based on the rotation angle of the steering shaft of the automobile.

BRIEF DESCRIPTION OF THE DRAWINGS

FIG. 1 is a partial structural diagram for illustrating one embodiment of a rotation angle detection apparatus in accordance with the present invention.

FIG. 2A and FIG. 2B are cross sectional views for illustrating an exemplary detailed structure of a rotation sensor that is served as the rotation angle detection unit in the rotation angle detection apparatus shown in FIG. 1.

DETAILED DESCRIPTION OF THE PREFERRED EMBODIMENTS

Figure 3:
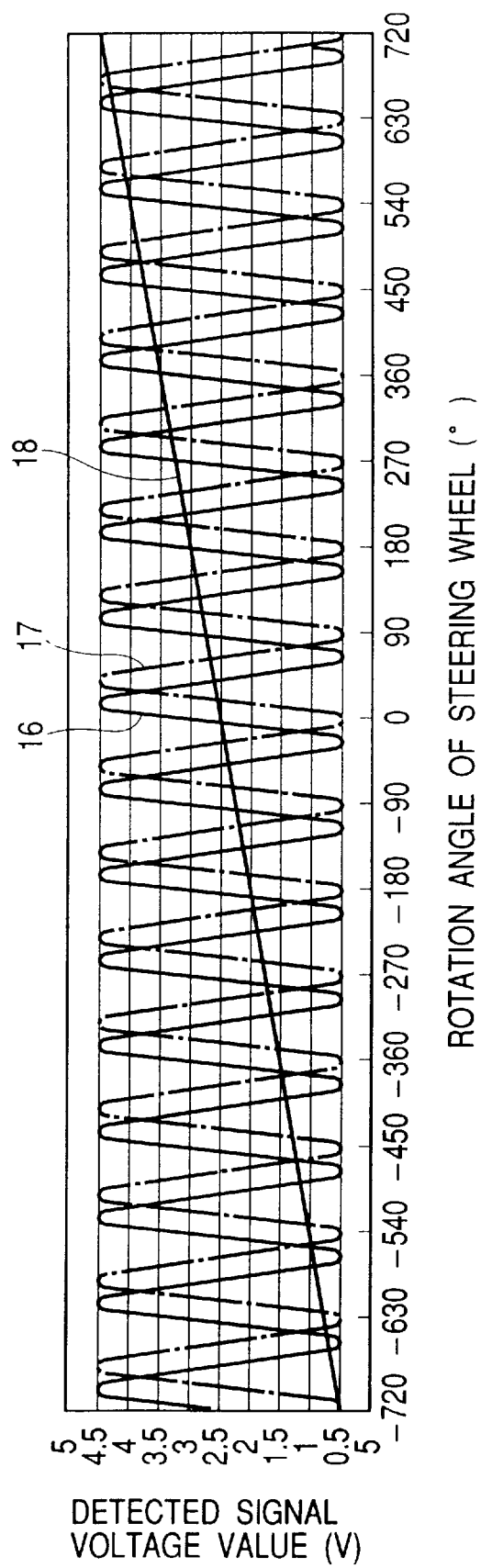
FIG. 3 is a characteristic diagram for describing the relation between the rotation angle of a steering wheel and the respective detection signal voltage values of the first to third angle detection signals generated from the rotation angle detection unit in the rotation angle detection apparatus shown in FIG. 1.

Embodiments of the present invention will be described hereinafter with reference to the drawings.

FIG. 1 is a partial structural diagram excepting the one case for illustrating the first embodiment of a rotation angle detection apparatus in accordance with the present invention.

As shown in FIG. 1, the rotation angle detection apparatus in accordance with the first embodiment comprises a rotation angle detection unit 1, a control unit 2, a memory unit 3, a controller 4, a controlled mechanism 5, and a local area network (LAN) bus line 6. In this case, the rotation angle detection unit 1 is coupled to a steering shaft (not shown in the drawing) of an automobile, and the controlled mechanism 5 comprises a suspension mechanism and an automatic transmission mechanism or the like of the automobile.

The rotation angle detection unit 1 is connected to the control unit 2, the control unit 2 is connected to the controller 4 by way of the LAN bus line 6, and the memory unit 3 is also connected to the controller 2.

FIG. 2A and FIG. 2B are sectional views for illustrating an exemplary detailed structure of a rotation sensor that is served as the rotation angle detection unit 1, FIG. 2A is a side cross sectional view, and FIG. 2B is a cross sectional view along the line A—A of FIG. 2A.

As shown in FIG. 2A and FIG. 2B, the rotation sensor is provided with a box 7, a rotor 8, a rotation shaft 9, a bearing 10, a helical gear 11, a slider 12, the first magnet $13_1$ the second magnet $13_2$, the first Hall element $14_1$, the second Hall element $14_2$, the third Hall element $14_3$, and a circuit board 15.

The box 7 comprises a case 7A and a cover 7B, and the cover 7B covers the aperture of the case 7A so as to form the box 7. One ring ridge 7C is formed on the bottom of the case 7A, and another ring ridge 7D is formed on the inside surface of the cover 7B. The rotor 8 that is formed in the drum shape is fixed to the steering shaft so that the steering shaft (not shown in the drawing) of the automobile is inserted into the center of the aperture, a projection 8A having a narrow width is formed at the middle of the width of the outer periphery, and a helical large gear 8B is formed on the entire periphery of the projection 8A. The both outer peripheries of the rotor 8 are engaged with the inside of the ring projections 7C and 7D when the box 7 is formed, and the rotor is hung rotatably in the box 7 so that the narrow width projection 8A is projected outside from the space between the ring projections 7C and 7D. The one end of the rotation shaft 9 is attached to the case 7A with interposition of the bearing 10, and the other end is attached to the case 7A with interposition of the corrugated washer 10A, and a screw groove is formed on the outer periphery of the portion where the slider 12 is to be engaged with as described hereinafter. The helical small gear 11 is fit into the rotation shaft 9, and engaged with the helical large gear 8B. A cylindrical magnet holder 11A is connected to the helical small gear 11, and the cylindrical first magnet $13_1$ is fit around the magnet holder 11A. In this case, the first magnet $13_1$ has N pole and S pole at the portions facing in the circumferential direction. A screw groove (not shown in the drawing) is formed on the inner peripheral portion of the cylindrical slider 12 to which the rotation shaft 9 is to be fit, and screw grooves of both components are engaged to each other when the slider 12 is fit to the rotation shaft 9. A projection guide (not shown in the drawing) that is to be fit to the guide groove of the box 7 is provided on the outer periphery of the slider 12 and the rod-shaped second magnet $13_2$ is attached in the axis direction of the rotation shaft 9 so that the slider 12 is not rotated together with the rotation shaft 9 when the rotation shaft 9 is rotated. In this case, the first magnet $13_1$ has N pole and S pole at the portions facing each other in the circumferential direction, and the second magnet $13_2$ has N pole at the one end and S pole at the other end. The first Hall element $14_1$ and the second Hall element $14_2$ are attached so as to be located near the cylindrical first magnet $13_1$ and so as to be located at an angle of 90 degrees with respect to the shaft center of the rotation shaft 9 on the circuit board 15. The third Hall element $14_3$ is attached on the circuit board 15 so as to be located near the rod-shaped second magnet $13_2$. The both ends of the circuit board 15 are held in the box 7 by means of a board holder (not shown in the drawing) when the box 7 is formed. In this case, the box 7 and the circuit board 15 constitute the base member, and the rotor 8 and the rotation shaft 9 constitute the whole rotor.

Furthermore, FIG. 3 is a characteristic diagram for showing the relation between the rotation angle of the steering wheel generated from the rotation angle detection unit (rotation sensor) 1 and the respective detection signal voltage values of the first to third angle detection signals 16 to 18 in the rotation angle detection apparatus in accordance with the first embodiment. FIG. 3 is the same as the characteristic diagram for the rotation angle detection apparatus that uses the rotation sensor described with reference to the above-mentioned proposal.

Herein, the operation of the rotation angle detection apparatus in accordance with the first embodiment will be described with reference to the structural diagram shown in FIG. 1, FIG. 2A, and FIG. 2B, and the characteristic diagram shown in FIG. 3.

In the rotation angle detection unit 1, the rotor 8 to which the steering shaft is inserted is rotated when the steering wheel of the automobile is rotated and the steering shaft that is coupled to the steering wheel is rotated. When the rotor 8 is rotated, the helical small gear 11 that is engaged with the helical large gear 8B of the rotor 8 and the rotation shaft 9 that is attached to the helical small gear 11 are concomitantly rotated simultaneously. When the helical small gear 11 rotated, the magnet holder 11A that is connected to the helical small gear 11 and the first magnet $13_1$ that is attached to the magnet holder 11A are concomitantly rotated simultaneously. Furthermore, when the first magnet $13_1$ is rotated, the spaces between the N pole and S pole of the first magnet $13_1$ and the first Hall element $14_1$ and the second Hall element $14_2$ that are attached near the first magnet $13_1$ change periodically, and the first Hall element $14_1$ and the second Hall element $14_2$ generate the first angle detection signal 16 and the second angle detection signal 17 having the same maximum amplitude and the same period and having the phase difference of 1/4 wavelength as shown in FIG. 3. In this case, the term "amplitude" is defined as the value obtained by subtracting the average value of the output voltage maximum value and the output voltage minimum value of the first (second) angle detection signal 16 (17) from the first (second) angle detection signal 16 (17) voltage value. In the same manner, when the rotation shaft 9 is rotated, the slider 12 having the screw groove that is engaged with the rotation shaft 9 slides in the axis direction of the rotation shaft 9, and the second magnet $13_2$ that is attached to the slider 12 is slid in the axis direction of the rotation shaft 9. The space between the N pole and S pole of the second magnet $13_2$ and the third Hall element $14_3$ is changed because the second magnet $13_2$ slides. Concomitantly, the third Hall element $14_3$ generates the third angle detection signal 18 that increases linearly with changing of the rotation angle of the steering wheel in one period as shown in FIG. 3. The first angle detection signal 16, the second angle detection signal 17, and the third angle detection signal 18 generated from the rotation angle detection unit 1 are supplied to the control unit 2.

As shown in FIG. 3, the voltage difference between the maximum value and the minimum value of the first angle detection signal 16 and the second angle detection signal 17 in the first embodiment is 4.0 V and one period is corresponding to the rotation angle of 90 degrees of the steering wheel, the phase difference is 1/4 wavelength that is corresponding to the rotation angle of 22.5 degrees of the steering wheel, the minimum value and the maximum value of the third angle detection signal 18 are 0.5 V and 4.5 V respectively, and one period is corresponding to the rotation angle of 1440 degrees of the steering wheel.

Generally, because a steering wheel can be rotated approximately two turns (rotation angle of +720 degrees) in one direction (right direction) from the neutral position (rotation angle of 0 degree) and approximately two turns (rotation angle of −720 degrees) in the other direction (left direction) from the neutral position, then the rotation angle of the steering wheel (steering shaft) of the rotation angle detection unit 1 requires the rotation angle range of ±720 degrees from the reference neutral position namely total rotation angle range of 1440 degrees.

The control unit 2 transfers the supplied first angle detection signal 16, second angle detection signal 17, and third angle detection signal 18 to the memory unit 3, the memory unit 3 overwrites the new first angle detection signal 16, second angle detection signal 17, and third angle detection signal 18 on the already stored first angle detection signal 16, second angle detection signal 17, and third angle detection signal 18, and thus the memory content of the memory unit 3 is updated.

Furthermore, the control unit 2 detects the rotation direction of the steering wheel, the rough rotation angle, and the fine rotation angle by use of the new first angle detection signal 16, second angle detection signal 17, and third angle detection signal 18. In this case, the rotation direction of the steering wheel and the rough rotation angle from the neutral position (rotation angle of 0 degree) are detected in the same manner as used for detecting the rotation direction of the steering wheel and the rough rotation angle from the neutral position by use of the third angle detection signal 18 in the control unit of the conventional rotation angle detection apparatus described already hereinabove. Therefore, in the first embodiment, the description of the detection operation of the rotation direction of the steering wheel and the rough rotation angle from the neutral position executed in the control unit 2 is omitted.

On the other hand, the detection of the fine rotation angle of the steering wheel by use of the first angle detection signal 16 and the second angle detection signal 17 executed in the control unit 2 is performed according to the following sequential operation.

Figure 4:
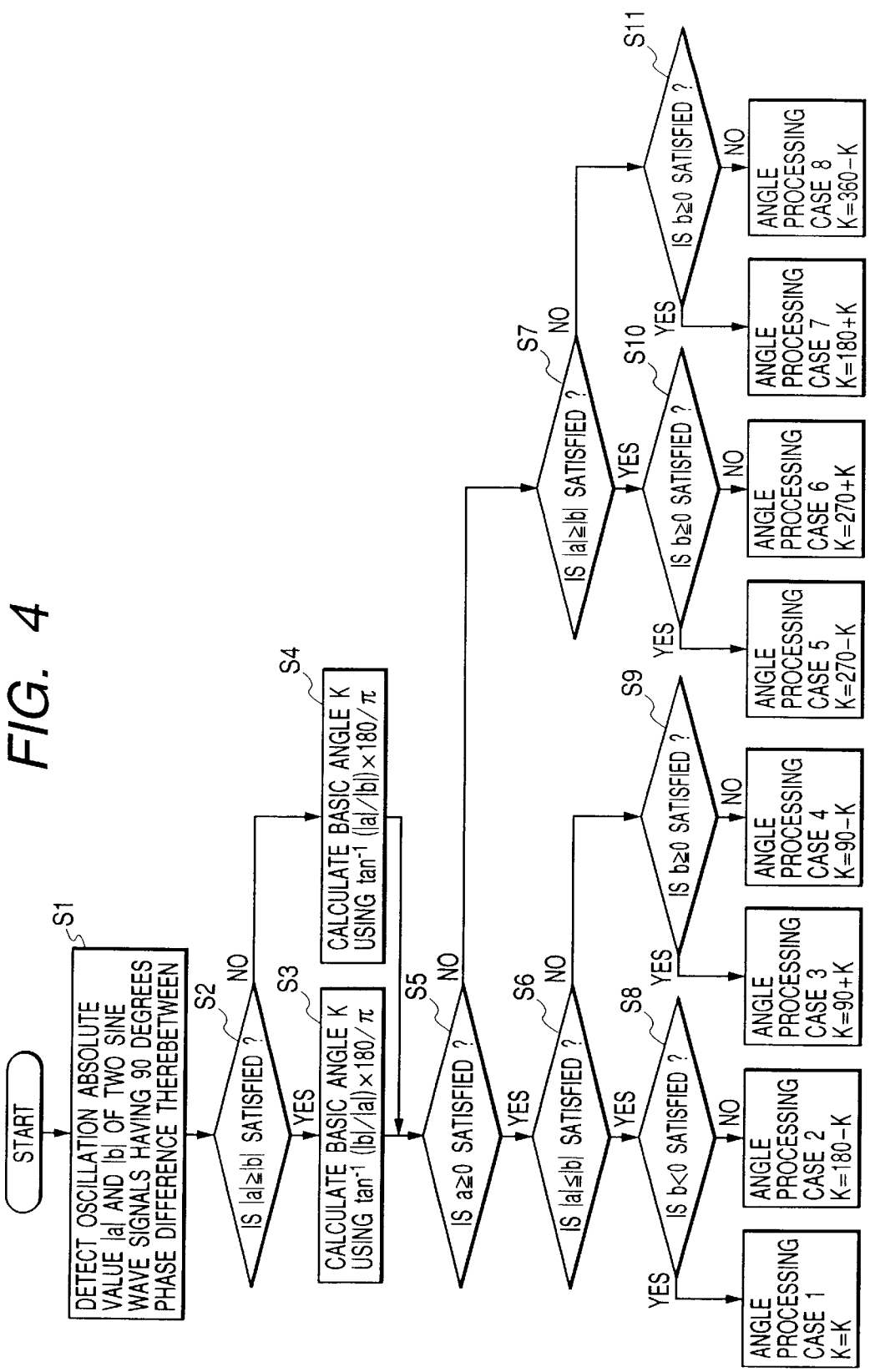
FIG. 4 is a flow chart for describing the operation sequence implemented when the control unit detects the fine rotation angle in the rotation angle detection apparatus in accordance with the above-mentioned embodiment.

FIG. 4 is a flow chart for describing the sequential operation implemented when the control unit 2 detects the fine rotation angle in the rotation angle detection apparatus of the first embodiment.

The detection operation for detecting the fine rotation angle executed in the control unit 2 is described herein under using the flow chart shown in FIG. 4.

At first, in step S1, the control unit 2 continuously receives the first angle detection signal 16 and the second angle detection signal 17 from the rotation angle detection unit 1, and detects the amplitude absolute value |a| of the received first angle detection signal 16 and the amplitude absolute value |b| of the received second angle detection signal 17.

Next, in step S2, the control unit 2 determines whether |a| is equal to or larger than |b| or not by use of the detected two amplitude absolute values |a| and |b|. If |a| is determined to be equal to or larger than |b| (Y), then the sequence proceeds to the next step S3, on the other hand if |a| is determined to be smaller than |b| (N), then the sequence proceeds to another step S4.

Next, in step S3, the control unit 2 calculates the basic rotation angle k by use of the following equation including the two amplitude absolute values |a| and |b| namely tan$^{-1}$ (|b|/|a|)×(180/π), and the sequence proceeds to the next step S5.

Furthermore, in step S4, the control unit 2 calculates the basic rotation angle k by use of the following equation including the two amplitude absolute values |a| and |b| namely tan$^{-1}$ (|a|/|b|)×(180/π), and the sequence proceeds to the step S5 similarly.

In the subsequent step S5, the control unit 2 determines whether the amplitude a of the first angle detection signal 16 is equal to or larger than 0 or not. If the amplitude a is determined to be equal to or larger than 0 (Y), then the sequence proceeds to the next step S6, and on the other hand if the amplitude a is determined to be smaller than 0 (N), then the sequence proceeds to another step S7.

In the subsequent step S6, the control unit 2 determines whether the ↑a| is equal to or smaller than |b| or not by use of the two amplitude absolute values |a| and |b|. If |a| is determined to be equal to or smaller than |b| (Y), then the sequence proceeds to the next step S8, and on the other hand if the |a| is determined to be larger than |b| (N), then the sequence proceeds to another step S9.

Furthermore, in step S7, the control unit 2 determines whether |a| is equal to or larger than |b| or not by use of the two amplitude absolute values |a| and |b|. If |a| is determined to be equal to or larger than |b| (Y), then the sequence proceeds to the next step S10, and on the other hand |a| is determined to be smaller than |b| (N), then the sequence proceeds to another step S11.

Next, in step S8, the control unit 2 determines whether the amplitude b of the second angle detection signal 17 is smaller than 0 or not. If the amplitude b is determined to be smaller than 0 (Y), then the sequence proceeds to the angle processing case 1, and on the other hand if the amplitude b is determined to be not smaller than 0 (N), then the sequence proceeds to the angle processing case 2.

Next, in step S9, the control unit 2 determines whether the amplitude b of the second angle detection signal 17 is equal to or larger than 0 or not. If the amplitude b is determined to be equal to or larger than 0 (Y), then the sequence proceeds to the angle processing case 3, and on the other hand if the amplitude b is determined to be smaller than 0 (N), then the sequence proceeds to the angle processing case 4.

In the subsequent step S10, the control unit 2 determines whether the amplitude b of the second angle detection signal 17 is equal to or larger than 0 or not. If the amplitude b of determined to be equal to or larger than 0 (Y), then the sequence proceeds to the angle processing case 5, and on the other hand if the amplitude b is determined to be smaller than 0 (N), then the sequence proceeds to the angle processing case 6.

In the subsequent step S11, the control unit 2 determines whether the amplitude b of the second angle detection signal 17 is equal to or larger than 0 or not. If the amplitude b is determined to be equal to or larger than 0 (Y), then the sequence proceeds to the angle processing case 7, and on the other hand if the amplitude b is determined to be smaller than 0 (N), then the sequence proceeds to the angle processing case 8.

The reason why|a| is compared with |b|, the smaller value is divided by the larger value, and the arctangent of the quotient is calculated in the above-mentioned sequential operation is that if the larger value is divided by the smaller value, then the divergent value or the approximately divergent value is obtained, and such result should be prevented. In other words, in the case that the divergent or approximately divergent arctangent is obtained, the computing error will be large.

Figure 5:
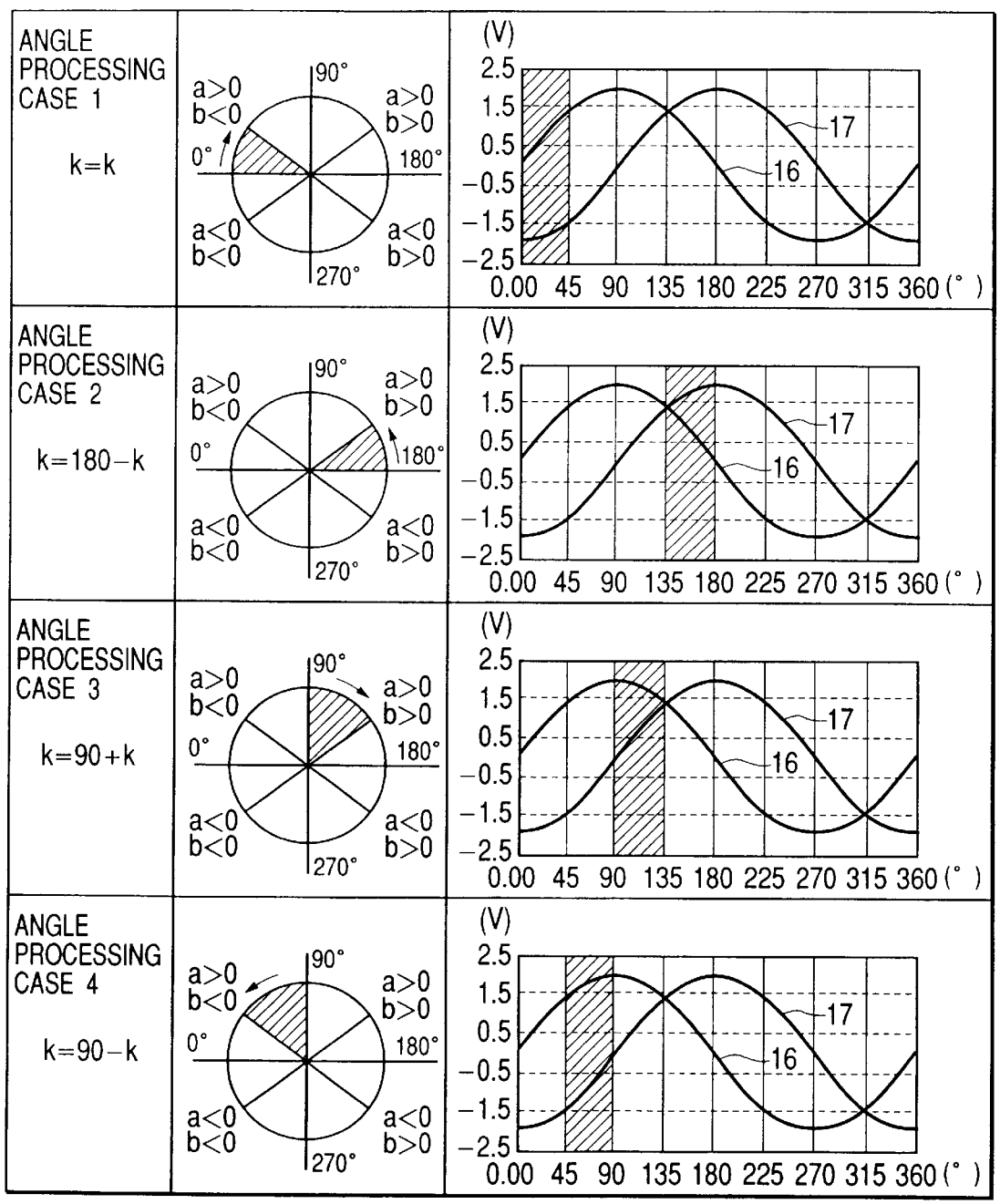
FIG. 5 is an explanatory diagram for showing that the amplitude of the first angle detection signal and the second angle detection signal described in each of the angle processing cases 1 to 4 shown in FIG. 4 corresponds to which rotation angle range of the circular graph and the signal waveform.
Figure 6:
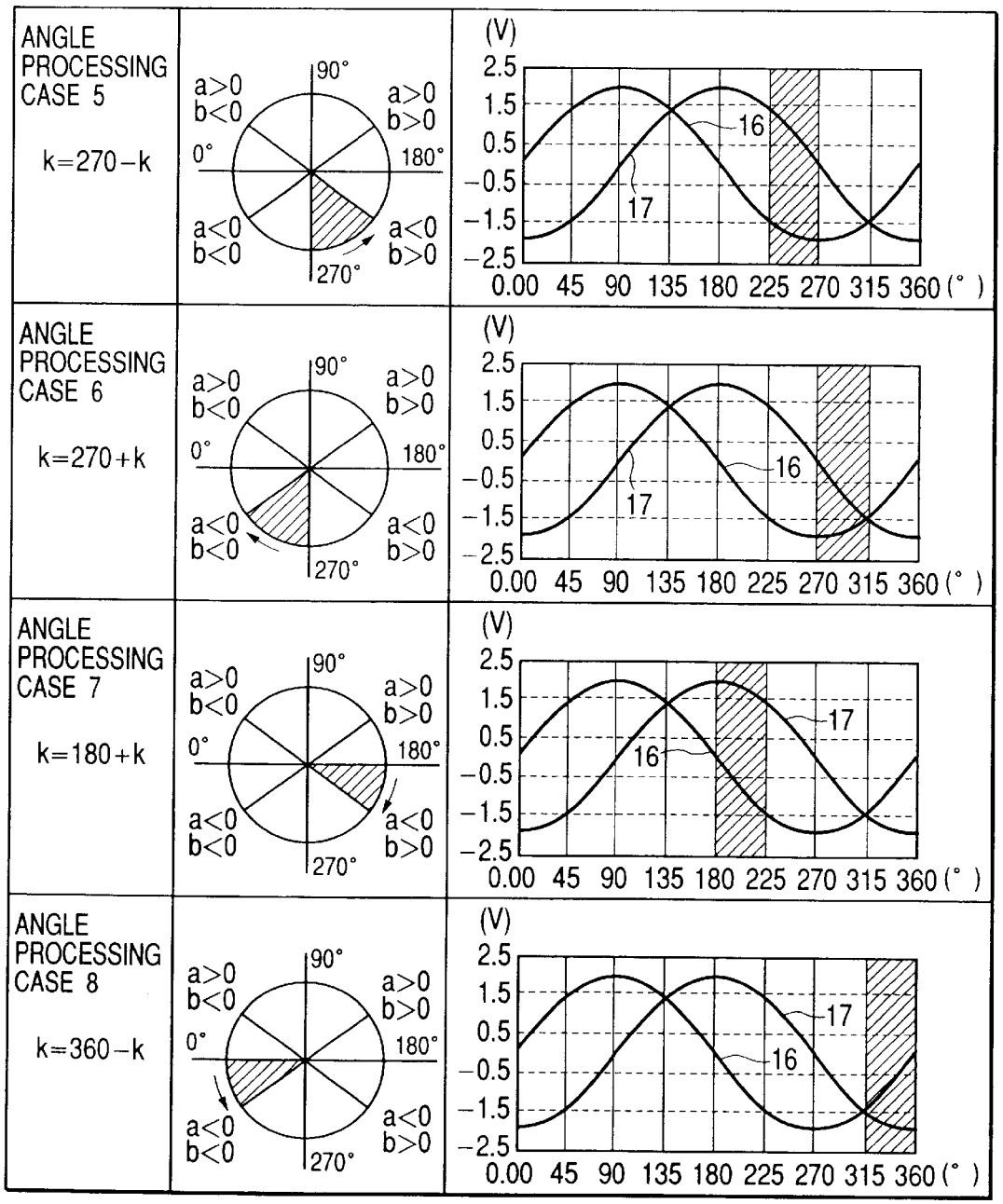
FIG. 6 is an explanatory diagram for showing that the amplitude of the first angle detection signal and the second angle detection signal described in each of the angle processing cases 5 to 8 shown in FIG. 4 corresponds to which rotation angle range of the circular graph and the signal waveform.

FIG. 5 and FIG. 6 are explanatory diagrams for showing that the amplitude a of the first angle detection signal 16 and the amplitude b of the second angle detection signal 17 in the respective angle processing cases 1 to 8 shown in FIG. 4 correspond to which rotating angle range of the circle graph and the signal waveform.

In the above-mentioned explanatory diagrams for describing the signal waveform, the axis of ordinate represents the voltage value (V) of the detection signal and the axis of abscissa represents the rotation angle (degree) of the steering wheel.

In the circle graphs shown in FIG. 5 and FIG. 6, the direction of the rotation angle is set positive in the clockwise direction on the assumption that the rotation angle at the time point when the amplitude a of the first angle detection signal 16 becomes 0 and the amplitude b of the second angle detection signal 17 becomes the minimum value is regarded as 0 degree. In the respective signal waveforms corresponding to the circle graphs, the rotation angle at the time point when the amplitude a of the first angle detection signal 16 becomes 0 and the amplitude b of the second angle detection signal becomes the minimum value is set to 0 degree, and the rotation angle at the time point when the amplitude a of the first angle detection signal 16 becomes 0 again and the amplitude b of the second angle detection signal becomes the maximum value is set to 180 degrees.

As shown in the first row in FIG. 5, the angle processing case 1 involves the case in which the rotation angle ranges from 0 degree to 45 degrees, and the two amplitudes a and b satisfy a>0 and b<0. The rotation angle k in the case 1 is measured in the clockwise direction with reference of 0 degree. Therefore, it is not necessary to convert the basic rotation angle k that has been calculated in the rotation angle range to the different angle value, and the basic rotation angle k is detected as k=k as it is.

Next, as shown in the second row in FIG. 5, the angle processing case 2 involves the case in which the rotation angle ranges from 135 degrees to 180 degrees, and the two amplitudes a and b satisfy a>0 and b>0. The rotation angle k in the case 2 is measured in the anticlockwise direction with reference of 180 degrees. Therefore, it is necessary to convert the basic rotation angle k that has been calculated in the rotation angle range to the different angle value 180–k, and the basic rotation angle k is detected as k=180–k.

Next, as shown in the third row in FIG. 5, the angle processing case 3 involves the case in which the rotation angle ranges from 90 degrees to 135 degrees, and the two amplitudes a and b satisfy a>0 and b>0. The rotation angle k in the case 3 is measured in the clockwise direction with reference of 90 degrees. Therefore, it is necessary to convert the basic rotation angle k that has been calculated in the rotation angle range to the different angle value 90+k, and the basic rotation angle k is detected as k=90+k.

Subsequently, as shown in the fourth row in FIG. 5, the angle processing case 4 involves the case in which the rotation angle ranges from 45 degrees to 90 degrees, and the two amplitudes a and b satisfy a>0 and b<0. The rotation angle k in the case 4 is measured in the anticlockwise direction with reference of 90 degrees. Therefore, it is necessary to convert the basic rotation angle k that has been calculated in the rotation angle range to the different angle value 90–k, and the basic rotation angle k is detected as k=90–k.

Furthermore, as shown in the first row in FIG. 6, the angle processing case 5 involves the case in which the rotation angle ranges from 225 degrees to 270 degrees, and the two amplitudes a and b satisfy a<0 and b>0. The rotation angle k in the case 5 is measured in the anticlockwise direction with reference of 270 degrees. Therefore, it is necessary to convert the basic rotation angle k that has been calculated in the rotation angle range to the different angle value 270–k, and the basic rotation angle k is detected as k=270–k.

Next, as shown in the second row in FIG. 6, the angle processing case 6 involves the case in which the rotation angle ranges from 270 degrees to 315 degrees, and the two amplitudes a and b satisfy a<0 and b<0. The rotation angle k in the case 6 is measured in the clockwise direction with reference of 270 degrees. Therefore, it is necessary to convert the basic rotation angle k that has been calculated in the rotation angle range to the different angle value 270+k, and the basic rotation angle k is detected as k=270+k.

Next, as shown in the third row in FIG. 6, the angle processing case 7 involves the case in which the rotation angle ranges from 180 degrees to 225 degrees, and the two amplitudes a and b satisfy a<0 and b>0. The rotation angle k in the case 7 is measured in the clockwise direction with reference of 180 degrees. Therefore, it is necessary to convert the basic rotation angle k that has been calculated in the rotation angle range to the different angle value 180+k, and the basic rotation angle k is detected as k=180+k.

Subsequently, as shown in the fourth row in FIG. 6, the angle processing case 8 involves the case in which the rotation angle ranges from 315 degrees to 360 degrees, and the two amplitudes a and b satisfy a<0 and b<0. The rotation angle k in the case 8 is measured in the anticlockwise direction with reference of 360 degrees. Therefore, it is necessary to convert the basic rotation angle k that has been calculated in the rotation angle range to the different angle value 360–k, and the basic rotation angle k is detected as k=360–k.

The control unit 2 regards the respective angle values obtained by means of the conversion in every rotation angle ranges corresponding to the angle processing cases 1 to 8 as the basic rotation angle k, and detects the fine rotation angle of the steering wheel based on the angle value that is regarded as the basic rotation angle k.

Thereafter, the control unit 2 generates the detection information that indicates the rotation direction of the steering wheel and the rotation angle from the neutral position based on the detected rotation direction, rough rotation angle, and fine rotation angle of the steering wheel, and supplies the generated detection information to the controller 4 through the LAN bus line 6.

The controller 4 finely controls the controlled mechanism 5 such as the suspension and automatic transmission based on the supplied detection information.

Figure 7:
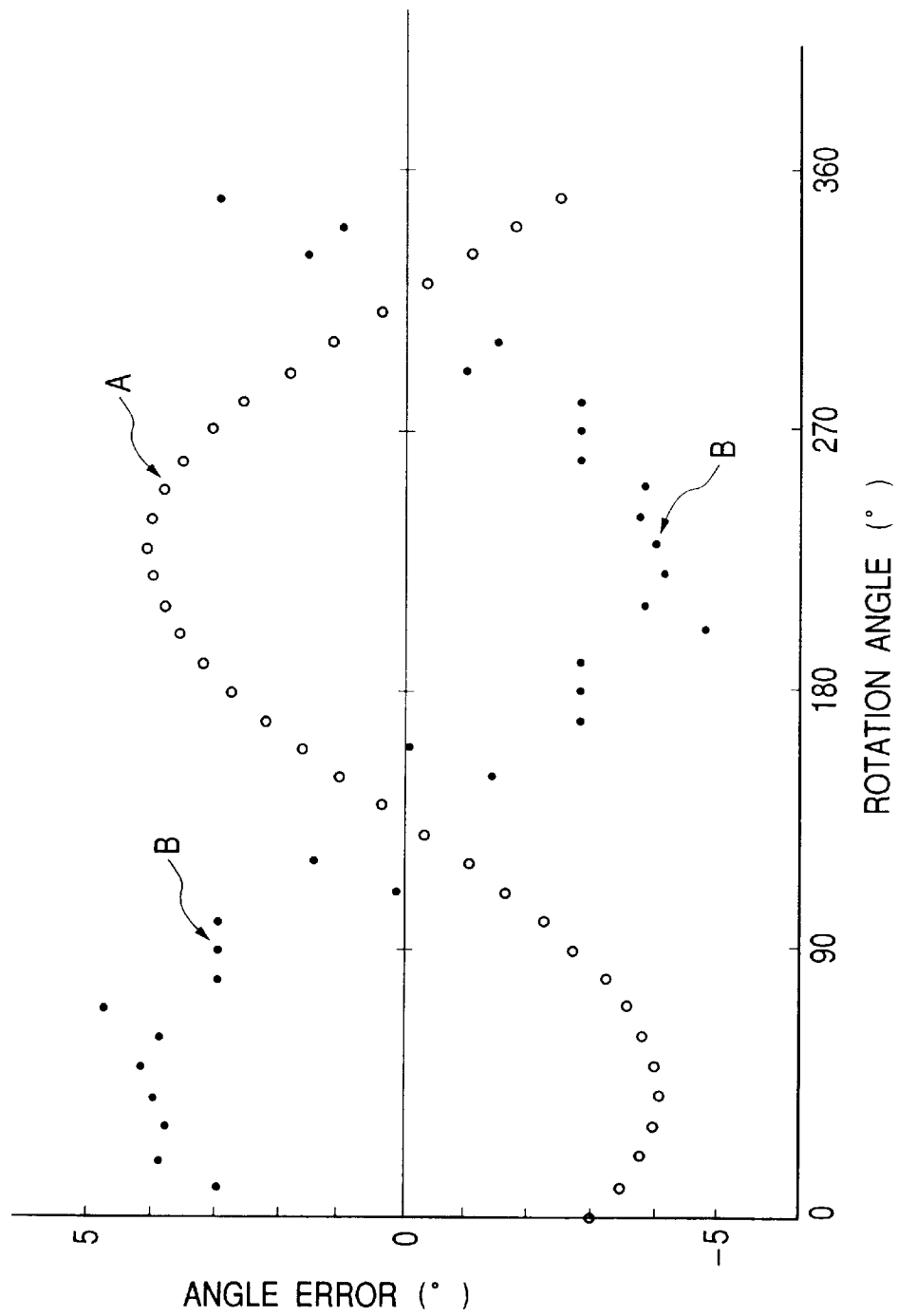
FIG. 7 is a characteristic diagram for describing an exemplary angle error generation of the rotation angle value detected by means of the rotation angle detection apparatus of the above-mentioned embodiment in the rotation angle range from 0 degree to 360 degrees.

Herein, FIG. 7 is a characteristic diagram for showing an exemplary rotation angle value angle error generation detected by means of the rotation angle detection apparatus of the first embodiment in the rotation angle range from 0 degree to 360 degrees. For comparison, an exemplary rotation angle value angle error generation detected by means of the conventional rotation angle detection apparatus according to the above-mentioned new proposal is also shown in FIG. 7.

In FIG. 7, the axis of abscissa represents the rotation angle in degree and the axis of ordinate represents the rotation angle error in degree. The white circle train A represents the angle error train obtained by means of the rotation angle detection apparatus of the first embodiment, and the black circle train B represents the angle error train obtained by means of the conventional rotation angle detection according to the above-mentioned new proposal.

As shown in FIG. 7, the maximum angle error of the angle error train obtained by means of the rotation angle detection apparatus of the first embodiment is approximately +4 degrees and –4 degrees, on the other hand the maximum angle error of the angle error train obtained by means of the rotation angle detection apparatus according to the above-mentioned new proposal is as wide as approximately +5 degrees and –5 degrees, and it is obvious that the angle error obtained by means of the rotation angle detection apparatus of the first embodiment is smaller.

As described hereinabove, in the rotation angle detection apparatus of the first embodiment, because the fine rotation angle of the steering wheel is detected by means of the method in which the arctangent angle of the ratio of the absolute value of the amplitude a of the first angle detection signal 16 to the absolute value of the amplitude b of the second angle detection signal 17 is determined, and the fine rotation angle of the steering wheel is detected under the condition that the first angle detection signal 16 and the second angle detection signal 17 are made continuous by use of the determined arctangent angle, even though the linear slope portions of the first angle detection signal 16 and the second angle detection signal 17 include slight rotation angle detection error, the influence of the rotation angle detection error is not serious, and the rotation angle can be detected with a high accuracy.

Furthermore, because the angle is determined by calculating the arctangent, even though the output of the first angle detection signal 16 and the second angle detection signal 17 is reduced due to deterioration of the Hall elements $14_1$ and $14_2$, both Hall elements $14_1$ and $14_2$ deteriorate similarly, the influence of the deterioration is offset, and as the result the arctangent value is scarcely affected.

The case is described hereinabove, in which the arctangent angle calculation processing case is selected correspondingly to the polarity of the amplitude a of the first angle detection signal 16 and the amplitude b of the second angle detection signal 17 and correspondingly to the magnitudinous relation between the absolute values of the amplitude a and the amplitude b. However, a case may be applied, in which the arctangent angle calculation processing case is selected by use of either the amplitude a of the first angle detection signal 16 or the amplitude b of the second angle detection signal 17.

Though the rotation angle detection apparatus in accordance with the first embodiment is capable of detecting the rotation angle with a high accuracy, the angle value k that has been converted from the basic rotation angle k includes the slight rotation angle error represented by the angle error string $\beta_1$ because the angle error string $\beta_1$ is generated. In this case, as it is obvious from the characteristic shown in FIG. 7, the angle error string $\beta_1$ is a signal having the amplitude that changes in the sine waveform fashion in the rotation angle range from 0 degree to 360 degrees, namely cosine wave signal. The cause of cosine wave signal generation that affects as the angle error string $\beta_1$ is attributed to the slight positional deviation of the attached position of the first Hall element $14_1$ for generating the first angle detection signal 16 and the second Hall element $14_2$ for generating the second angle detection signal 17 in the rotation angle detection unit 1 from the right position that makes the phase difference between the first angle detection signal 16 and the second angle detection signal 17 just 90 degrees.

It could be first means in order to eliminate the angle error string $\beta_1$ included in the angle value k detected by means of the rotation angle detection apparatus that the attaching position of the first Hall element $14_1$ and the second Hall element $14_2$ is selected as to be located at the right position. However, it is very difficult to attach the first Hall element $14_1$ and the second Hall element $14_2$ at the right position because of the limited mechanical accuracy, and it is usual that these Hall elements are attached at the position with slight deviation from the right position.

It is second means in order to eliminate the angle error string $\beta_1$ included in the angle value k detected by means of the rotation angle detection apparatus that, because the signal that represents the angle error string $\beta_1$ is a cosine wave signal, a correction value (correction cosine wave signal) $\beta_2$ that is to substantially eliminate the cosine wave signal is generated, and the generated correction value $\beta_2$ is subtracted from the angle error string $\beta_1$, that is, $\beta_1-\beta_2$ is calculated, to thereby obtain the angle value k without the angle error string $\beta_1$ that has been converted from the basic rotation angle k.

In the rotation angle detection apparatus in accordance with the second embodiment, the second way is used. The control unit 2 generates the correction value $\beta_2$ as described herein under to obtain the corrected angle value k that includes no angle error string $\beta_1$.

At first, the positional deviation of the actually attached position of the first Hall element $14_1$ and the second Hall element $14_2$ from the right attaching position is measured physically, and the measured deviation α degrees is entered into the control unit 2.

Next, the control unit 2 calculates the correction value $\beta_2$ according to the following equation by use of the entered deviation a degree and the detected angle value k that is regarded as the basic rotation angle k.

$$\beta_2=\cos(k\cdot\pi/90)\times(\alpha/4)/2-(\alpha/4)/2$$

In the equation described above, if α=0, then $\beta_2$=0.

Next, the control unit 2 calculates $\beta_1-\beta_2$ between the angle error string $\beta_1$ and the correction value $\beta_2$ and obtains the corrected angle value k having no angle error string $\beta_1$.

Figure 8:
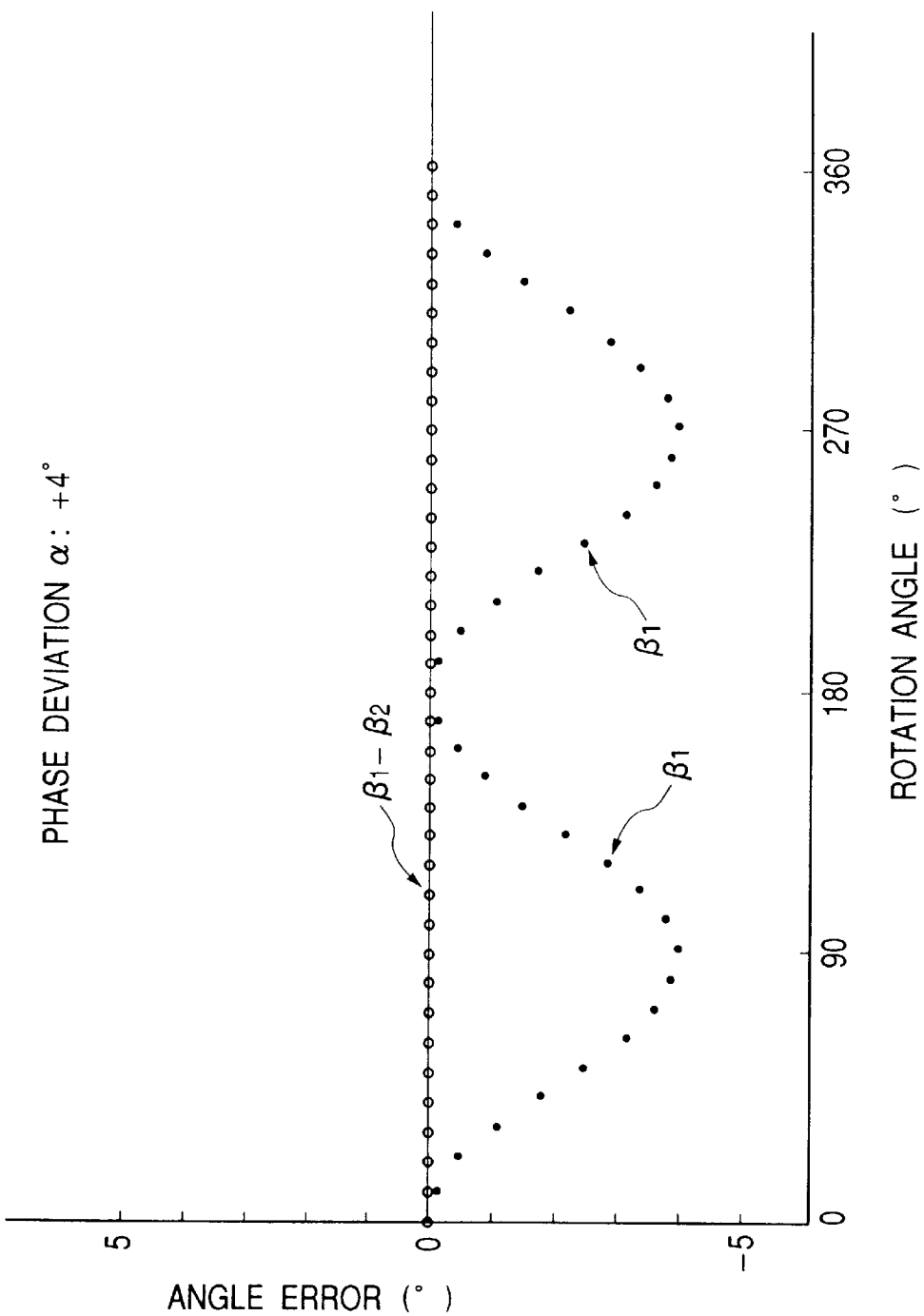
FIG. 8 is a characteristic diagram for describing the rotation angle error of the angle error string $\beta_1$ and the value $\beta_1-\beta_2$ obtained by subtracting the correction value from the angle error string in the case that the measured deviation a degree is +4 degrees in the rotation angle detection apparatus in accordance with the second embodiment.

FIG. 8 is a characteristic diagram for showing the rotation angle error between the angle error string $\beta_1$ and the value $\beta_1-\beta_2$ obtained by subtracting the correction value $\beta_2$ from the angle error string $\beta_1$ in the rotation angle range from 0 degree to 360 degrees for the case that the measured deviation α degree is +4 degrees in the rotation angle detection apparatus in accordance with the second embodiment.

Figure 9:
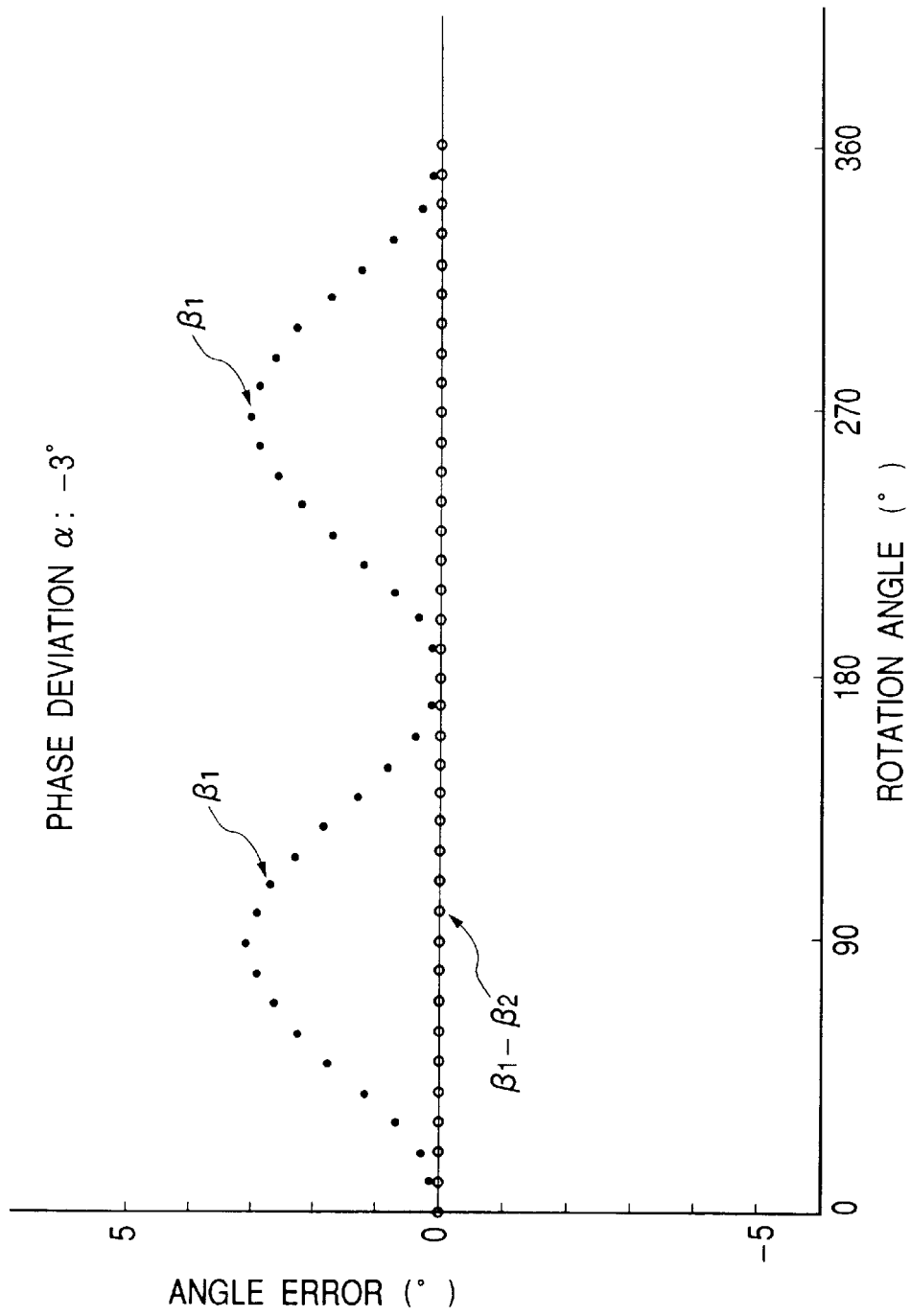
FIG. 9 is a characteristic diagram for describing the rotation angle error of the angle error string $\beta_1$ and the value $\beta_1-\beta_2$ obtained by subtracting the correction value from the angle error string in the case that the measured deviation a degree is −3 degrees in the rotation angle detection apparatus in accordance with the second embodiment.
Figure 10:
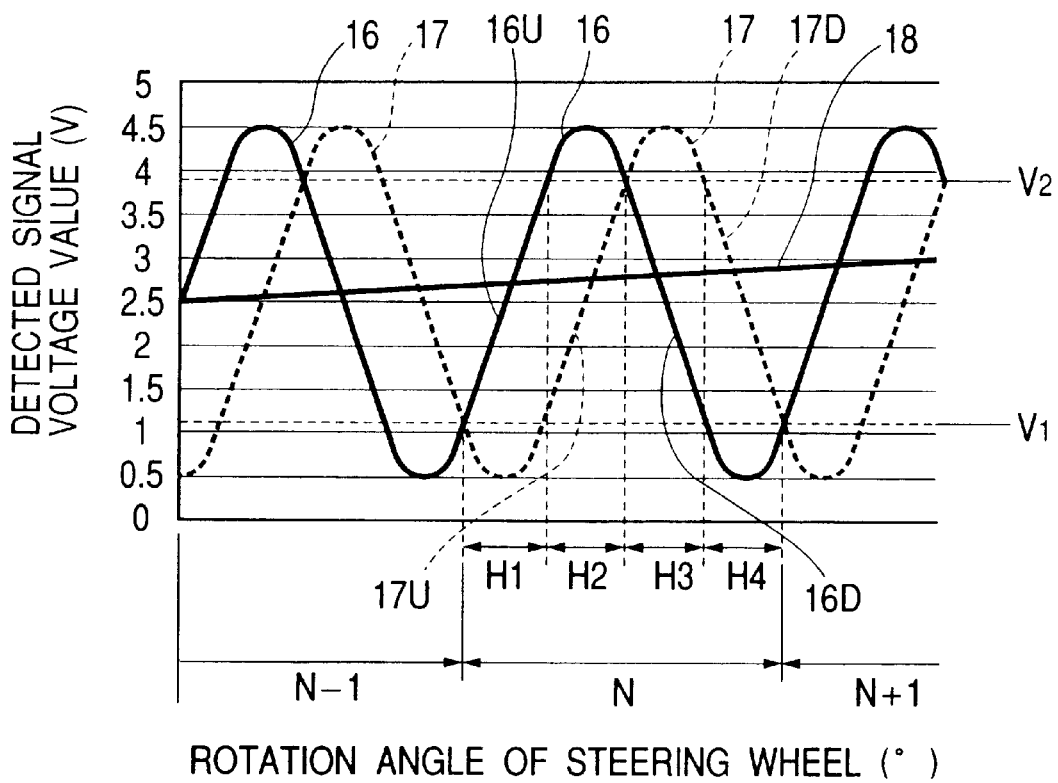
FIG. 10 is a partially enlarged view of the characteristic diagram shown in FIG. 3.

Furthermore, FIG. 9 is a characteristic diagram for showing the rotation angle error between the angle error string $\beta_1$ and the value $\beta_1-\beta_2$ obtained by subtracting the correction value $\beta_2$ from the angle error string $\beta_1$ in the rotation angle range from 0 degree to 360 degrees for the case that the measured deviation α degree is −3 degrees in the rotation angle detection apparatus in accordance with the second embodiment.

In FIG. 8 and FIG. 9, the axis of abscissa represents the rotation angle in degree and the axis of ordinate represents the rotation angle error in degree.

As shown in FIG. 8 and FIG. 9, the maximum angle error of the angle error string $\beta_1$ obtained by means of the rotation angle detection apparatus of the first embodiment is +3 degrees or −4 degrees, on the other hand the angle error string $\beta_1-\beta_2$ obtained by means of the rotation angle detection apparatus of the second embodiment is almost 0 degree. It is obvious that the angle error included in the corrected angle value k obtained by means of the rotation angle detection apparatus of the second embodiment is far smaller.

As described hereinabove, because the rotation angle detection apparatus of the second embodiment makes the angle error string $\beta_1$ almost 0 by subtracting the generated correction value $\beta_2$, the rotation angle detection apparatus is capable of detecting the rotation angle with a higher accuracy in addition to the effect obtained by applying the rotation angle detection apparatus of the first embodiment.

As described hereinbefore, according to the invention, in the case that the rotation angle is detected by use of the first angle detection signal and the second angle detection signal generated from the rotation angle detection unit, the amplitude of the first angle detection signal and the second angle detection signal is continuously detected, the amplitude absolute value of the detected first angle detection signal and the amplitude absolute value of the detected second angle detection signal are compared, and when the absolute value of the one angle detection signal is equal to or smaller than the absolute value of the other angle detection signal, the basic rotation angle of the rotor is calculated by use of the cotangent angle of the value obtained by dividing the one amplitude absolute value by the other amplitude absolute value, a plurality of angle processing cases are set correspondingly to the calculated amplitude of the first angle detection signal and/or the second angle detection signal, and the detected basic rotation angle is converted to a different angle value according to the predetermined conversion equation for each of the plurality of set angle processing cases. As the result, the rotation angle can be detected without adverse influence of the rotation angle detection error by use of the continuous amplitude value of the first angle detection signal and the second angle detection signal, and the obtained rotation angle value is converted to an angle value that is suitable for angle processing for each of the angle processing cases. Thereby, the rotation angle can be detected with a high accuracy.

What is claimed is:

1. A rotation angle detection apparatus comprising:

a rotor connected to a rotating body;

a rotation angle detection unit for generating a first angle detection signal and a second angle detection signal of the sine waveform having a constant maximum amplitude and a same period and having approximately 1/4 wavelength phase difference concomitantly with a rotation of the rotor;

a memory unit for storing the first angle detection signal and the second angle detection signal; and a control unit, wherein the control unit continuously detects amplitude absolute values of the first angle detection signal and the second angle detection signal, compares the detected amplitude absolute value of the first angle detection signal and amplitude absolute value of the second angle detection signal to determine if the amplitude absolute value of the first angle detection signal or the amplitude absolute value of the second angle detection signal is a smaller amplitude absolute value or a larger amplitude absolute value, determines an arctangent angle of a quotient value obtained by dividing the smaller amplitude absolute value by the larger amplitude absolute value to calculate the basic rotation angle of the rotating body, sets a plurality of angle processing cases based on the amplitude value of the first angle detection signal and/or the amplitude value of the second angle detection signal that have been calculated, and converts a detected basic rotation angle to a different angle value according to a predetermined conversion equation for each of the plurality of angle processing cases that have been set as described hereinabove, and the rotation angle of the rotating body is thereby detected.

2. The rotating angle detection apparatus according to claim 1, wherein the rotation angle detection unit has two magnetic sensors facing to a magnet, and the two magnetic sensors generate the first angle detection signal and the second angle detection signal respectively concomitantly with rotation of the rotor.

3. The rotation angle detection apparatus according to claim 1, wherein the detected basic rotation angle is corrected by use of the correction value that depends on the attached position error value of the two magnetic sensors.

4. The rotation angle detection apparatus according to claim 1, wherein the plural processing cases are set correspondingly to 8 angle processing cases.

5. The rotation angle detection apparatus according to claim 1, wherein the angle processing case is set depending on the polarity, namely positive polarity or negative polarity, of each amplitude and the magnitude of the amplitude absolute value of the amplitude in the case that the first angle detection signal and the second angle detection signal are both used.

6. The rotation angle detection apparatus according to claim 4, wherein the set angle processing case is selected so that; the arctangent angle is set as the rotation angle when the amplitude value of the first angle detection signal is equal to or larger than zero, the amplitude absolute value of the first angle detection signal is equal to or smaller than the amplitude absolute value of the second angle detection signal, and the amplitude value of the second angle detection signal is smaller than zero; the value obtained by subtracting the arctangent angle from 180 degrees is set as the rotation angle when the amplitude value of the first angle detection signal is equal to or larger than zero, the amplitude absolute value of the first angle detection signal is equal to or smaller than the amplitude absolute value of the second angle detection signal, and the amplitude value of the second angle detection signal is equal to or larger than zero; the value obtained by adding the arctangent angle to 90 degrees is set as the rotation angle when the amplitude value of the first angle detection signal is equal to or larger than zero, the amplitude absolute value of the first angle detection signal is larger than the amplitude absolute value of the second angle detection signal, and the amplitude value of the second angle detection signal is equal to or larger than zero; the value obtained by subtracting the arctangent angle from 90 degrees is set as the rotation angle when the amplitude value of the first angle detection signal is equal to or larger than zero, the amplitude absolute value of the first angle detection signal is larger than the amplitude absolute value of the second angle detection signal, and the amplitude value of the second angle detection signal is smaller than zero; the value obtained by subtracting the arctangent angle from 270 degrees is set as the rotation angle when the amplitude value of the first angle detection signal is smaller than zero, the amplitude absolute value of the first angle detection signal is equal to or larger than the amplitude absolute value of the second angle detection signal, and the amplitude value of the second angle detection signal is equal to or larger than zero; the value obtained by adding the arctangent angle to 270 degrees is set as the rotation angle when the amplitude value of the first angle detection signal is smaller than zero, the amplitude absolute value of the first angle detection signal is equal to or larger than the amplitude absolute value of the second angle detection signal, and the amplitude value of the second angle detection signal is smaller than zero; the value obtained by adding the arctangent angle to 180 degrees is set as the rotation angle when the amplitude value of the first angle detection signal is smaller than zero, the amplitude absolute value of the first angle detection signal is smaller than the amplitude absolute value of the second angle detection signal, and the amplitude value of the second angle detection signal is equal to or larger than zero; and the value obtained by subtracting the arctangent angle from 360 degrees is set as the rotation angle when the amplitude value of the first angle detection signal is smaller than zero, the amplitude absolute value of the first angle detection signal is smaller than the amplitude absolute value of the second angle detection signal, and the amplitude value of the second angle detection signal is smaller than zero.

7. The rotation angle detection apparatus according to claim 1, wherein the rotating body is a steering shaft of an automobile, and the rotation angle signal calculated from the first angle detection signal and second angle detection signal is a steering angle signal of the steering shaft.

8. The rotation angle detection apparatus according to claim 6, wherein the steering angle detection signal is supplied to a controller through a local area network bus line installed in the automobile.

* * * * *